(12) United States Patent
Muno et al.

(10) Patent No.: US 7,225,194 B2
(45) Date of Patent: May 29, 2007

(54) COMPOSITE RECORD IDENTIFIER GENERATOR

(75) Inventors: Andreas Muno, Hirschberg (DE); Gerhard Fuchs, Sinsheim (DE)

(73) Assignee: Sap AG, Walldorf (DE)

( * ) Notice: Subject to any disclaimer, the term of this patent is extended or adjusted under 35 U.S.C. 154(b) by 582 days.

(21) Appl. No.: 10/743,055

(22) Filed: Dec. 23, 2003

(65) Prior Publication Data
US 2005/0091236 A1   Apr. 28, 2005

Related U.S. Application Data

(60) Provisional application No. 60/513,537, filed on Oct. 24, 2003.

(51) Int. Cl.
*G06F 17/00* (2006.01)
*G06F 7/00* (2006.01)

(52) U.S. Cl. .................. 707/100; 707/102
(58) Field of Classification Search ............. 707/100, 707/102
See application file for complete search history.

(56) References Cited

U.S. PATENT DOCUMENTS

| | | | |
|---|---|---|---|
| 5,937,408 A * | 8/1999 | Shoup et al. ............. 707/102 |
| 6,199,048 B1 | 3/2001 | Hudetz et al. | |
| 6,216,137 B1 * | 4/2001 | Nguyen et al. ............. 707/203 |
| 6,279,004 B1 | 8/2001 | Lee et al. | |
| 6,886,018 B1 * | 4/2005 | Boudris et al. ............. 707/203 |
| 7,013,298 B1 * | 3/2006 | De La Huerga ............. 707/3 |
| 2002/0147886 A1 | 10/2002 | Yanai et al. | |
| 2003/0070141 A1 | 4/2003 | Zeggert | |
| 2004/0015890 A1 * | 1/2004 | Wong et al. ............. 717/137 |
| 2004/0107205 A1 * | 6/2004 | Burdick et al. ............. 707/102 |
| 2005/0010579 A1 * | 1/2005 | Shoup et al. ............. 707/100 |

FOREIGN PATENT DOCUMENTS

WO   WO 02/42943   5/2002

* cited by examiner

*Primary Examiner*—Jeffrey Gaffin
*Assistant Examiner*—Cindy Nguyen
(74) *Attorney, Agent, or Firm*—Kenyon & Kenyon LLP

(57) ABSTRACT

Embodiments of the present invention relate to generating record identifiers in arbitrary formats using a general and configurable software system. The system may comprise a plurality of component generators to generate components of a record identifier, and a general composite record identifier constructor to construct the record identifier using components generated by the component generators.

18 Claims, 5 Drawing Sheets

COMPOSITE RECORD IDENTIFIER GENERATOR

CROSS-REFERENCE TO RELATED APPLICATIONS

This application claims the benefit of U.S. provisional application Ser. No. 60/513,537, filed Oct. 24, 2003.

FIELD OF THE INVENTION

Embodiments of the present invention relate to computer software for generating record identifiers in an arbitrary format.

BACKGROUND INFORMATION

Records of all kinds often have some sort of unique identifier associated with them, so as to be able to distinguish one from the other. In computerized databases, the identifier is often a key used for retrieval of a particular record or records from the vast numbers of records that such databases can contain.

The needs or preferences of entities that maintain large databases of records may dictate particular, varying formats for record identifiers. Departments of governments, for example, may establish regulations mandating certain formats that can vary from department to department. The business world may have needs for record identifiers that vary in as many ways as individual businesses can vary. Businesses that do work pursuant to government contracts may in particular need to conform their record identification formats to government regulations. According to such regulations or other considerations, record identifiers might, for example, need to include mixtures of numbers and letters in specific combinations or sequences. For instance, for a group of related records, a part of their respective identifiers might be required to serialize the records to differentiate between records in the group.

To meet the various requirements for record identifiers, past approaches in software to providing record identifiers have tended to be ad hoc and project-specific, and as a consequence, somewhat inflexible. This has meant that changing existing identifier formats or introducing new formats for new kinds of records has entailed considerable effort in terms of coding, because reworking of existing code or writing of new code has been needed.

SUMMARY OF THE INVENTION

Embodiments of the present invention relate to generating record identifiers in arbitrary formats using a general and configurable software system. The system may comprise a plurality of component generators to generate components of a record identifier, and a general composite record identifier constructor to construct the record identifier using components generated by the component generators. The constructor may consult customizing data structures to determine an arbitrary required format for a record identifier, and cause the component generators to generate components in accordance with the format.

The system according to the invention is general and configurable in that various different identifier formats may be constructed by the same code, that is, by the general constructor. Specificity, when it is needed, is contained in configurable features such as the customizing data structures. The system is therefore readily adaptable to new identifier formats, if called for, by suitably configuring only the customizing data structures rather than the system as whole.

DETAILED DESCRIPTION

Figure 1:
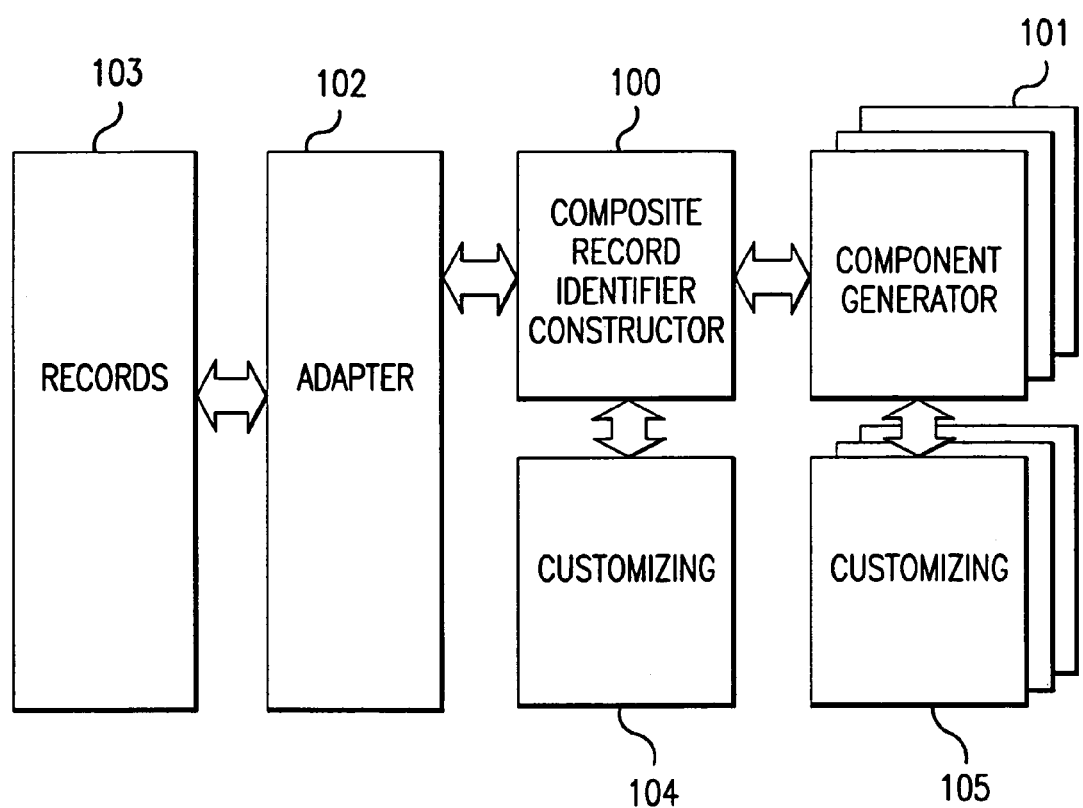
FIG. 1 shows a system according to embodiments of the present invention.

Referring to FIG. 1, embodiments of the present invention may comprise a general composite record identifier constructor 100 that is able to call and communicate with a plurality of component generators 101. The constructor 100 may communicate with a customizing data structure 104, and the component generators 101 may communicate with a customizing data structure 105. An adapter 102 may provide an abstraction layer between the constructor 100 and component generators 101, and records 103.

More specifically, the adapter 102 may be configured for any kind of record 103 to obtain information about the record from the record and/or from a system context. The information about the record may be use to generate an identifier for the record. The adapter 102 may be configured with specific knowledge about records, such as particular record formats and content, so that it can obtain needed information. The adapter 102 might also obtain information about a record 103 from a system context. For example, most business software relates to specific functions within a system, and using the software requires, for example, authorizing information such as user logon and user inputs to invoke the specific functions. Information such as a logon and other user inputs provide a system context from which the adapter 102 could derive information about a record 103 needed by the constructor 100. The adapter 102 may provide the information obtained to the constructor 100 and component generators 101 in a form usable by the constructor and component generators. In contrast to the adapter 102, the constructor 100 may be generalized in structure in that it operates on data provided to it in the form output by the adapter, but does not need to have specific knowledge about idiosyncrasies of particular records, such as their formats, content or other things.

Figure 2:
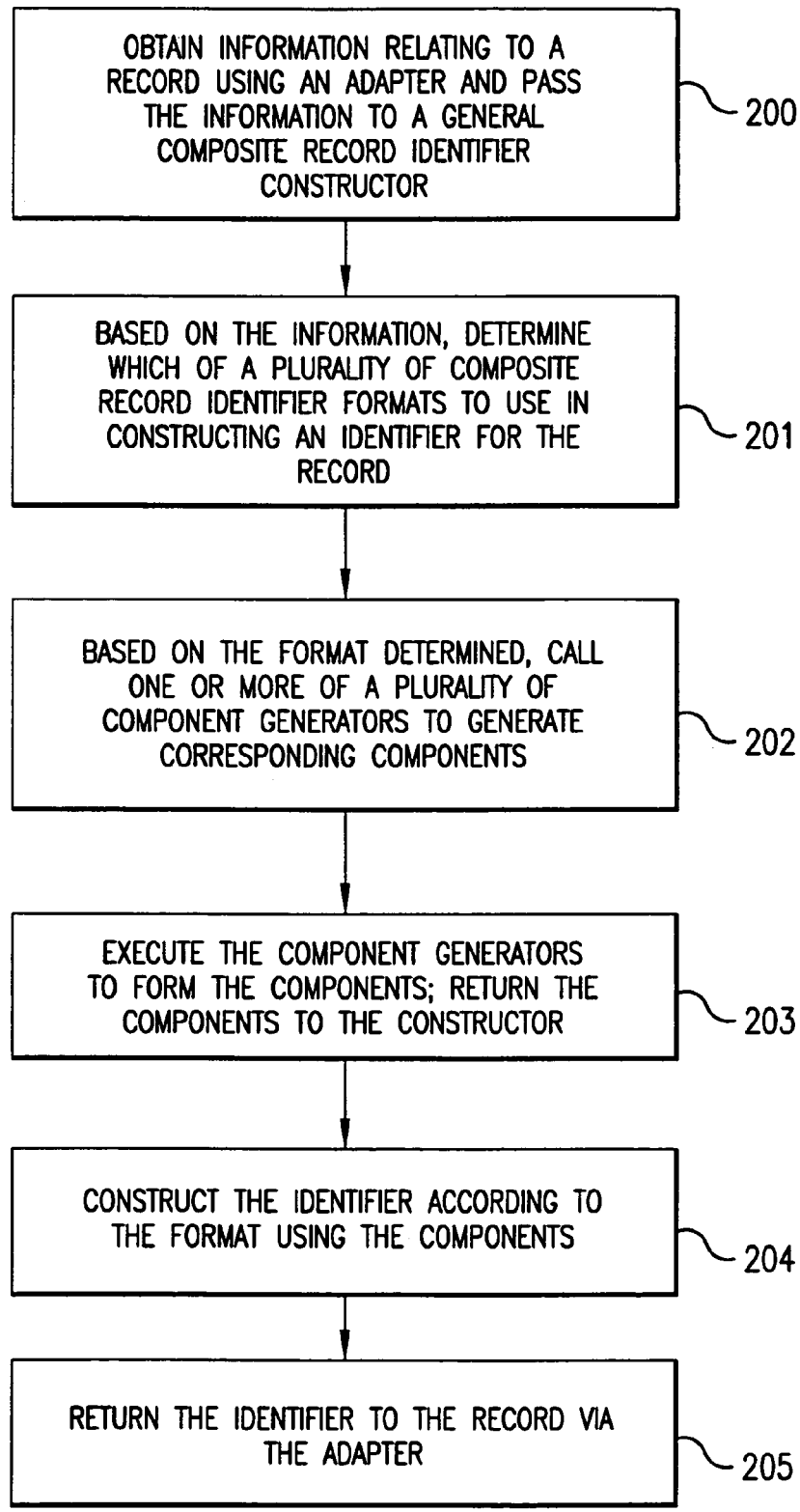
FIG. 2 shows a process flow according to embodiments of the present invention.

FIG. 2 shows a process flow according to embodiments of the present invention. As shown in block 200, the adapter 102 may obtain information relating to a record and pass the information to the constructor 100. As noted, records 103 may be of any kind. Examples of records that may be associated with business activities include purchase or sales orders, invoices, procurement contracts relating to government work, and the like. The information obtained by the adapter 102 relating to the records 103 may include, for example: temporal information (e.g., dates, times, etc.); factual information (e.g., a classification of a record type); organizational information (e.g., agencies, departments, businesses, etc.); and relational information (e.g., related or associated records).

As shown in block 201, based on the information passed by the adapter, the constructor 100 may determine which of a plurality of composite record identifier formats to construct. Each of the possible formats may comprise a plurality of distinct components. The formats are arbitrary and configurable. More specifically, to determine which identifier format to construct based on the information passed to it by the adapter, the constructor may consult a configurable customizing data structure 104. Customizing data structure 104 may contain information relating to what format of identifier should be constructed for a specific type of record, such as what components are to be included in the identifier, an order of the components and how they are to be distinguished from each other. For example, components may be distinguished from each by separators such as dashes, by differing respective lengths, or by a combination of differing respective lengths and separators. Such features are arbitrary and customizable by configuring customizing data structure 104 as needed.

When the constructor 100 has determined what format of identifier to construct, it may call one or more component generators 101 to generate corresponding components, as shown in block 202. The constructor 100 may forward information passed to it by the adapter to the component generators. As shown in block 203, each component generator may execute to form a specific component of a multi-component or composite identifier according to the format determined by the constructor, and return the component to the constructor.

The component generators may be customer-written programs written for specific customer needs. Customizing data structure 105 may include customer-specific information used by the component generators. For example, customizing data structure 105 could include a table containing a list of valid purchasing groups of an organization, the list being defined in terms of a first set of character strings, and a mapping of each character string of the first set of character strings to a character string in a second set of character strings to be used for purposes of forming a component of a record identifier. A component generator might receive specific organizational data obtained by the adapter 102 and forwarded to it by the constructor 100; the organizational data could be, for instance, a character string corresponding to a purchasing group of an organization. The component generator might read the table to determine whether the received character string corresponds to a valid purchasing group by comparing the received character string to the first set of character strings, and to obtain a corresponding character string to include in a record identifier from the second set of character strings.

As shown in block 204, the constructor 100 may construct the record identifier according to the format determined using the components generated by the component generators, and return the identifier to the record 103 via the adapter as shown in block 205. The record and its associated identifier may then, for example, be stored digitally in a computer database on a machine-readable medium such as disk.

The process described above may, for example, be invoked via various record-specific user interfaces. That is, a user may perform various operations relating to specific records via an interface containing a display field for a record identifier whose content is generated by the system according to the present invention. An example follows. Assume that a government agency, the Agency of Large Databases (ALD), mandates a record identifier format (which will be referred to hereafter as format 1) for purchase orders as follows:

department number-record creation month (in MMYY format)-project number-serial number of six digits.

Thus, an example of a record identifier for the ALD might look as follows:

ALD5-0603-035-000471.

Figure 3:
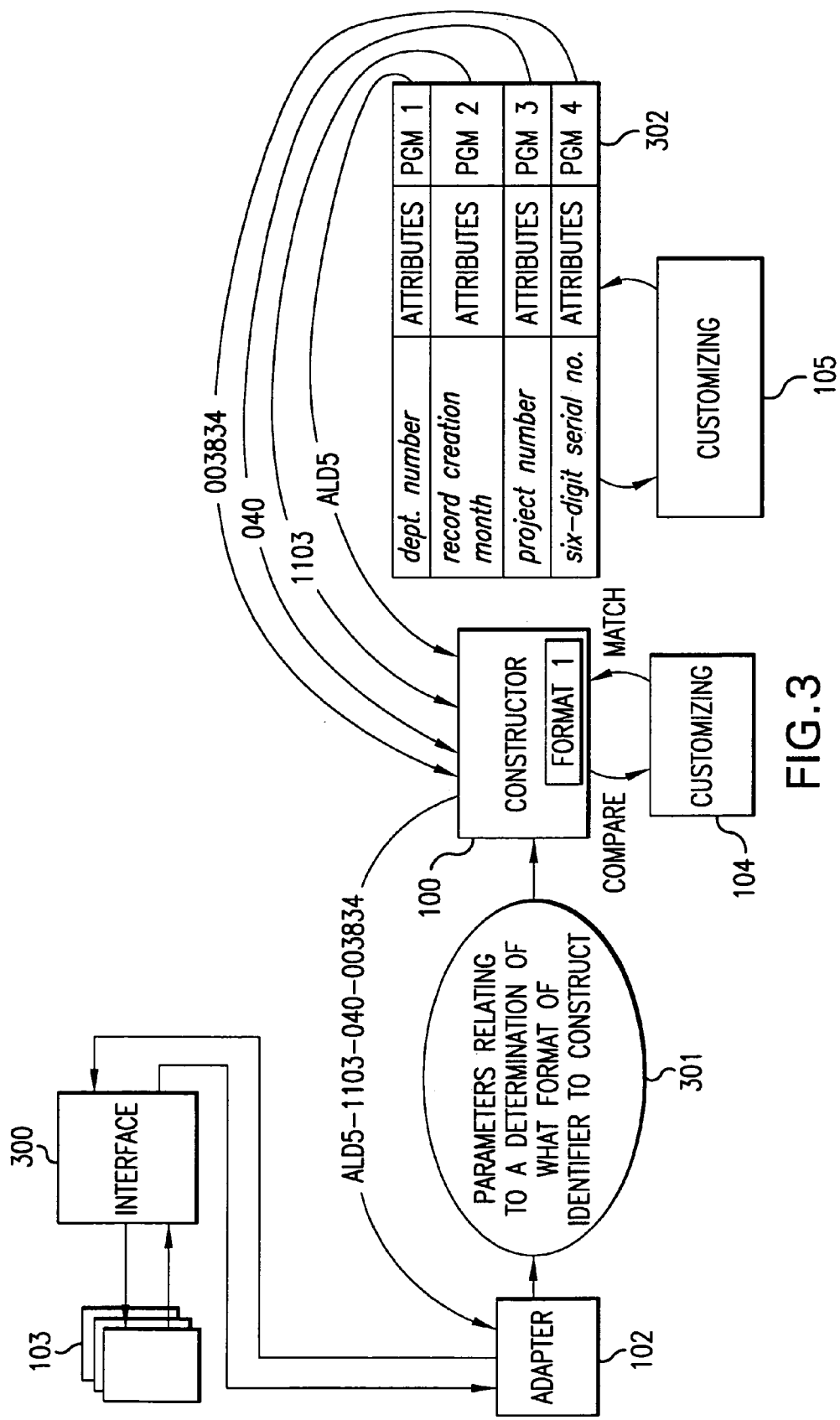
FIG. 3 shows a data flow in a system according to embodiments of the present invention.

Now assume that a user in department 5 (ALD5) of the ALD wants to create a new purchase order record. The user might proceed to call up a display of a user interface for performing operations relating to ALD records, and enter values to cause the purchase order to be created. As part of the creation of the new purchase order, software according to embodiments of the invention to generate a composite record identifier of the new purchase order might be invoked. Referring to FIG. 3, the software may call adapter 102, which may obtain, via an interface 300 therewith and/or via a system context, information relating to records 103 of the ALD. The interface 300, for example, could comprise a plurality of function calls via which data can be requested by and returned to the adapter. The information passed by the adapter to the constructor may include parameters 301 based on which the constructor makes a determination of what kind of identifier to build. For example, the information may include an organizational parameter (e.g., the record is being created for ALD5), a factual parameter such as a classification of a record type, a record type parameter identifying what kind of record the identifier is for (e.g., a purchase order, a contract, a bid invitation, a sales order) and a relational data parameter (e.g., a parameter concerning a contract that the purchase order is being created pursuant to).

Based on the parameters passed by the adapter, the constructor 100 may make a determination as to what kind of identifier to construct. More specifically, the constructor 100 may compare the parameters to entries in configurable tables in the customizing data structure 104. The entries may correspond to a plurality of templates or patterns for various record identifier formats, which are selectable based on the parameters passed by the adapter. For example, if a certain combination of parameters matches a given table entry or set of entries, this may be an indication that a record identifier of format A should be constructed; if, on the other hand, the combination of parameters matches a different table entry or set of entries, this may be an indication that a record identifier of format B should be constructed; and so on. In the particular example under discussion, the record type parameter could be "PO" (for "purchase order"), the adapter could determine from the system context that the purchase order is new, and the relational data parameter might indicate that there was no contract related to the purchase order. Based on these parameter values, the constructor 100 might form a selection criterion such as the character string "PO_created" and perform a look-up in tables in the customizing data structure 104 for a matching character string. The matching entry could contain the desired format of a record identifier for a new purchase order; the format may read by the constructor and used to construct a corresponding record identifier.

Assume that based on the parameters passed by the adapter 102, the constructor 100 determines that a record identifier of format 1 (see above) should be constructed. Referring to FIG. 3, the constructor may then call component generators 101 to build individual components of the identifier. As described previously, each component generator could be a specific program that is called to build a corresponding component and return it to the constructor.

Names of the component generator programs could be stored, for example, in a table 302 as shown in FIG. 3, along with corresponding component identifiers. Thus, based on the entry for component department number in the table, the constructor might call corresponding program PGM 1. PGM 1 may execute and return "ALD5" to the constructor. To determine the appropriate department number, PGM 1 might use information, such as organizational information, obtained by the adapter 102 from records 203 and forwarded to PGM 1 by the constructor 100. Further, PGM 1 might consult customizing data structure 105 to obtain customer-specific information as described previously.

Similarly, based on the entry for record creation month in the table, the constructor might call PGM 2, which would execute and return, say, "1103" to the constructor. Based on the entries for project number and serial number of six digits, PGM 3 and PGM 4 might each execute and return, say, "040" and "003834", respectively. Each of PGM 3 and PGM 4 may utilize in its execution information obtained by the adapter 102 and forwarded by the constructor 100. Further, each may consult customizing data structure 105 to obtain customer-specific information.

The constructor 100 may assemble the components returned to it by the component generators into a composite record identifier, and return it to the adapter 102. The composite record identifier could, as noted earlier, be displayed in a user interface and saved into a corresponding record on a database, for example.

Embodiments of the present invention may further provide for "versioning" of record identifier formats. That is, it may be desirable to be able to work with multiple different versions of record identifier formats for records of the same type. An example of a situation in which this capability might be useful is when a change in regulations governing records of a certain type mandates a change from one format of record identifier to a new, different format. The regulations could require that the change become effective at a particular date and time, and accordingly all records of the type affected by the regulations created or updated thenceforward might be assigned an identifier according to the new format. However, there could be a large number of pre-existing records in the system for which follow-on records needed to be created using one or more record identifier formats previously in effect.

For example, the pre-existing records could concern business with external parties (e.g., vendors, customers) who only recognize the record identifier formats previously in effect. Thus, new follow-on records to the previously-existing records might need to be assigned record identifiers in the format used by the previously-existing records, while new records which do not have a follow-on relationship to previously-existing records could be assigned record identifiers in a format prescribed by new regulations. For example, a pre-existing contract could have follow-on records (i.e., records deriving from or based on the contract) such as purchase orders and changes. The contract could have a record identifier according to a pre-existing format, and, for traceability, each of its follow-on records could have a record identifier incorporating the record identifier of the contract, to indicate the association of the follow-on record with the contract. To maintain this traceability, additional follow-on records to the pre-existing contract would need to be assigned record identifiers according to the pre-existing format, even though new regulations were in place requiring a new record identifier format for new contracts.

To accommodate such a situation, embodiments of the present invention may further comprise a version table. The version table may indicate which of a plurality of possible versions of record identifier formats is active in a system. Which of the versions is active may determine which version of a record identifier format is assigned to a newly-created record identifier. When the newly-created record identifier is stored, its corresponding version number may be stored along with it. When the record subsequently needs to be retrieved, the version number of its associated identifier may be one of the parameters that is specified.

Figure 4:
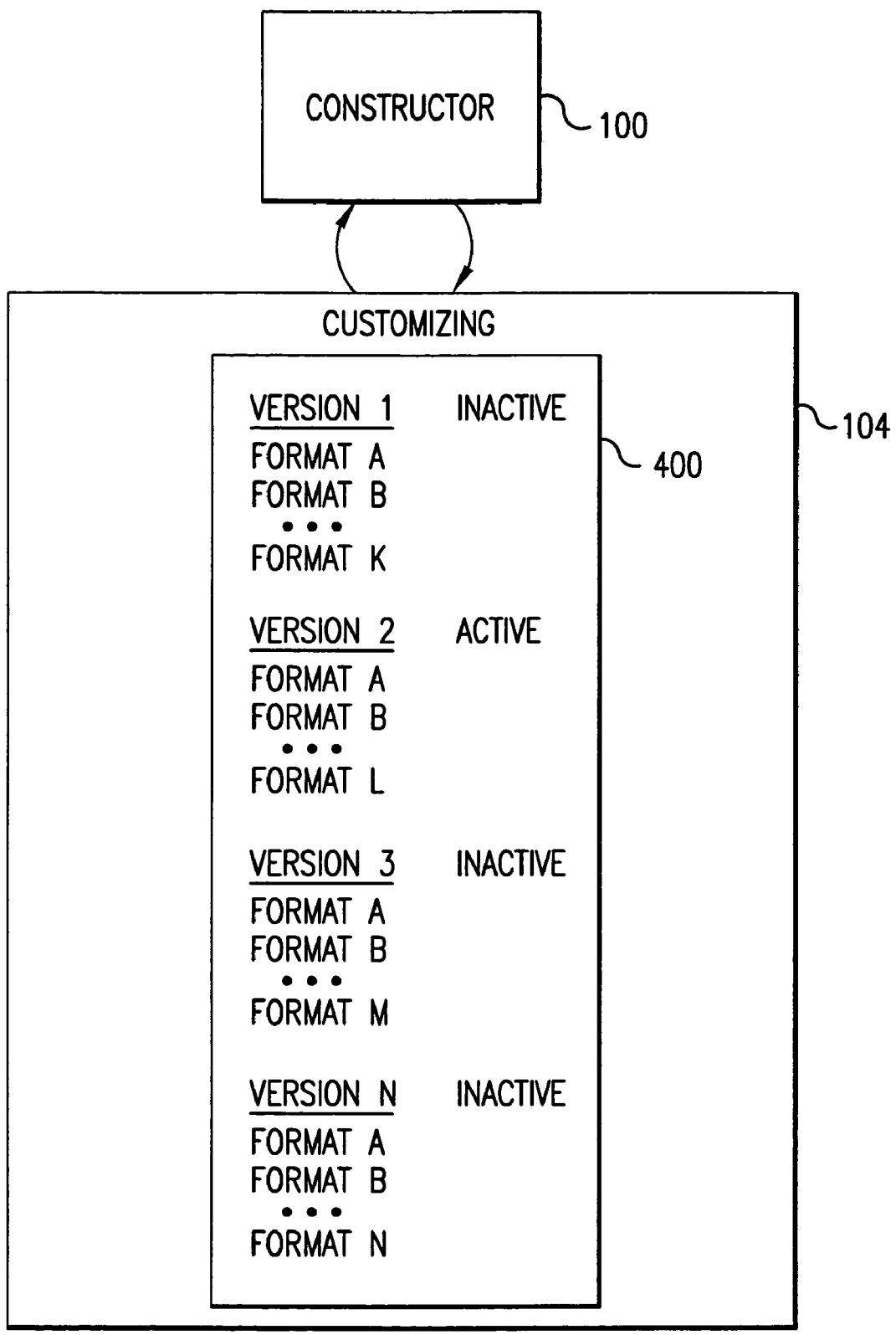
FIG. 4 shows a version table according to embodiments of the present invention.

As shown in FIG. 4, according to embodiments, the constructor 100 may refer to a version table 400 when determining what format of record identifier to construct. The table 400 may be included in the customizing data structure 104. The version table may contain a plurality of entries corresponding to possible versions of formats of record identifiers, each version having a status indicator to indicate whether it is active or not. Each version may have corresponding formats described in customizing data structure 104. Based on which version is indicated to be active in the version table 400, the constructor 100 may consult a corresponding description in the customizing data structure 104 to determine what format of record identifier to construct.

Figure 5:
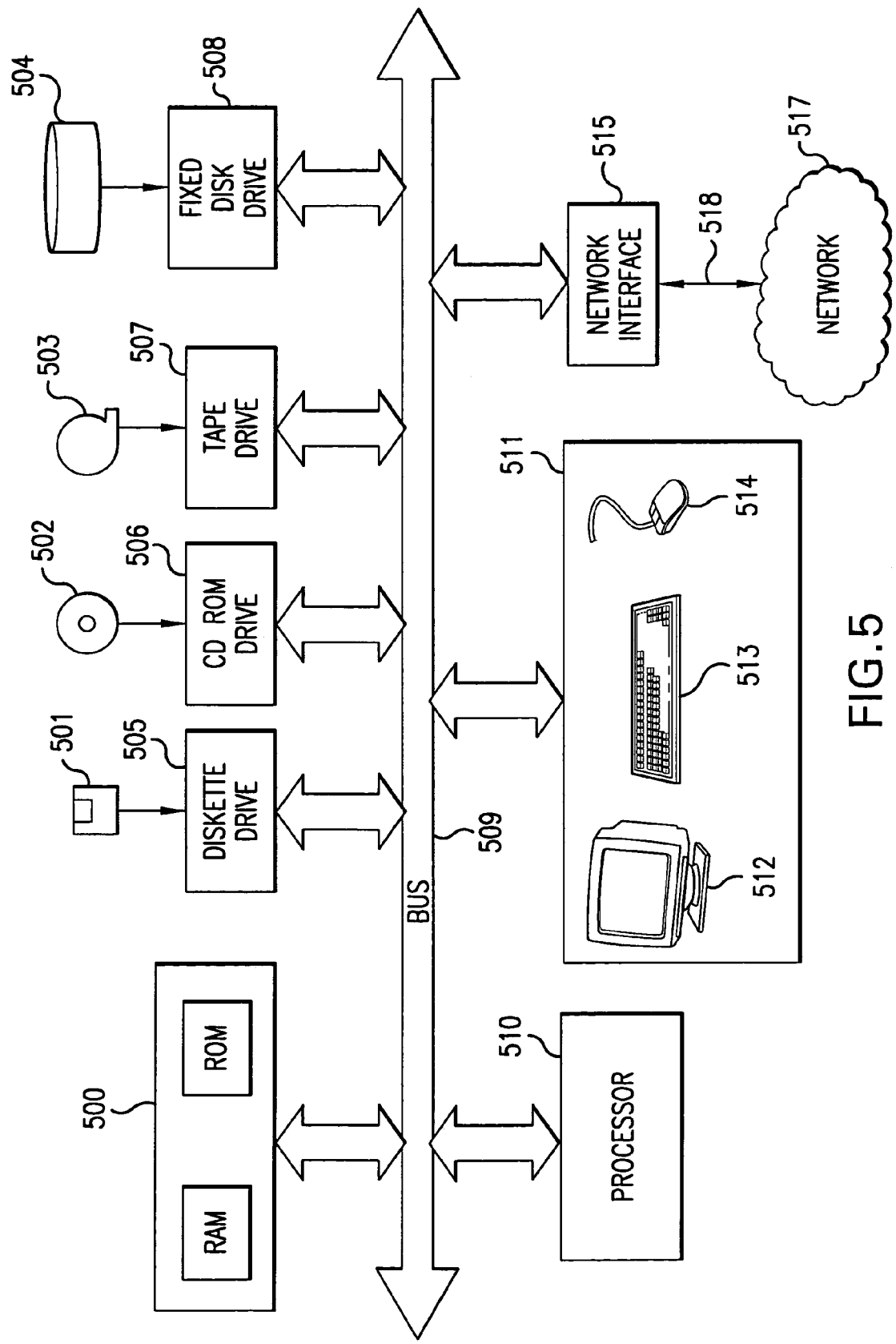
FIG. 5 shows a system for implementing embodiments of the present invention.

FIG. 5 shows a high-level representation of a computer system for implementing embodiments of the present invention, such as might be realized by a variety of known and commercially available hardware and software elements. The system may comprise a memory 500 including ROM and RAM, processor 510 and user interface 511 comprising a display device 512, keyboard 513 and mouse 514. Elements may communicate via a system bus 509. The system may further comprise a network 517 connected by a network medium 518 and network interface 515.

A computer program or collection of programs comprising computer-executable instructions according to embodiments of the present invention may be stored and transported on computer-usable media such as diskette 501, CD-ROM 502, magnetic tape 503 and fixed disk 504. The computer instructions may be retrieved from the computer-usable media 501–504 using their respective drives 505–508 into memory 500, and executed by a processor 510. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
   a memory to hold instructions;
   a processor coupled to the memory to execute the instructions, the instructions implementing:
      a plurality of component generators to generate components of a record identifier; and
      a composite record identifier constructor to construct the record identifier using components generated by the component generators;
      wherein the composite record identifier constructor is adapted to use format data to determine a format for the record identifier constructed by the composite record identifier constructor.

2. The system of claim 1, the instructions further implementing an adapter to provide information relating to a record to be assigned an identifier to the composite record identifier constructor.

3. The system of claim 2, wherein based on the information relating to a record, the composite record identifier constructor determines a format for the record identifier.

4. The system of claim 3, wherein based on the format, the composite record identifier constructor calls one or more of the component generators to generate a corresponding component.

5. The system of claim 1, the instructions further implementing a version table to determine a version of the record identifier.

6. A method comprising:
    obtaining information relating to a record for which an identifier is to be constructed;
    determining a format for the record identifier based on the information;
    executing one or more component generator programs based on the format to form components of the record identifier;
    constructing the record identifier from the components according to the format; and
    assigning the record identifier to the record.

7. The method of claim 6, wherein the information is obtained via an adapter that abstracts record-specific information into a form usable by the component generator programs.

8. The method of claim 6, wherein the determining includes referring to a configurable customizing data structure that describes a plurality of arbitrary record identifier formats.

9. The method of claim 7, further comprising referring to a version table to determine a version of the record identifier.

10. A machine-readable medium storing:
    a plurality of component generators to generate components of a record identifier; and
    a composite record identifier constructor to construct the record identifier using components generated by the component generators;
    wherein the composite record identifier constructor is adapted to use format data to determine a format for the record identifier constructed by the composite record identifier constructor.

11. The machine-readable medium of claim 10, wherein the composite record identifier constructor is further adapted to communicate with an adapter to provide information relating to a record to be assigned an identifier.

12. The machine-readable medium of claim 11, wherein based on the information relating to a record, the composite record identifier constructor determines a format for the record identifier.

13. The machine-readable medium of claim 12, wherein based on the format, the composite record identifier constructor calls one or more of the component generators to generate a corresponding component.

14. The machine-readable medium of claim 10, wherein the composite record identifier constructor is further adapted to use a version table to determine a version of the record identifier.

15. A machine-readable medium comprising computer-executable instructions to perform a process comprising:
    obtaining information relating to a record for which an identifier is to be constructed;
    determining a format for the record identifier based on the information;
    executing one or more component generator programs based on the format to form components of the record identifier;
    constructing the record identifier from the components according to the format; and
    assigning the record identifier to the record.

16. The machine-readable medium of claim 14, wherein the information is obtained via an adapter that abstracts record-specific information into a form usable by the component generator programs.

17. The machine-readable medium of claim 15, wherein the determining includes referring to a configurable customizing data structure that describes a plurality of arbitrary record identifier formats.

18. The machine-readable medium of claim 15, the process further comprising referring to a version table to determine a version of the record identifier.

* * * * *